US012724846B2

(12) United States Patent
Braun et al.

(10) Patent No.: US 12,724,846 B2
(45) Date of Patent: Sep. 1, 2026

(54) RE-WEIGHTED SELF-INFLUENCE FOR LABELING NOISE REMOVAL IN MEDICAL IMAGING DATA

(71) Applicant: Covera Health, New York, NY (US)

(72) Inventors: Joschka Braun, Darmstadt (DE); Micha Kornreich, New York, NY (US); Li Zhang, Princeton, NJ (US); JinHyeong Park, Princeton, NJ (US); Jayashri Pawar, Mahwah, NJ (US); Benjamin Odry, West New York, NJ (US); Richard Herzog, New York, NY (US)

(73) Assignee: Covera Health, New York, NY (US)

( * ) Notice: Subject to any disclaimer, the term of this patent is extended or adjusted under 35 U.S.C. 154(b) by 323 days.

(21) Appl. No.: 17/985,696

(22) Filed: Nov. 11, 2022

(65) Prior Publication Data

US 2023/0153377 A1 May 18, 2023

Related U.S. Application Data

(60) Provisional application No. 63/278,879, filed on Nov. 12, 2021.

(51) Int. Cl.
*G06F 18/00* (2023.01)
*G06N 3/08* (2023.01)

(52) U.S. Cl.
CPC ............... *G06F 18/00* (2023.01); *G06N 3/08* (2013.01); *G06T 2207/20081* (2013.01)

(58) Field of Classification Search
CPC ........ G06F 18/00; G06F 18/21; G06F 18/211; G06F 18/2115; G06F 18/214; G06N 3/08;
(Continued)

(56) References Cited

U.S. PATENT DOCUMENTS 11,049,044 B1 6/2021 Habenschuss et al.
2013/0132315 A1 5/2013 Principe et al.
(Continued)

FOREIGN PATENT DOCUMENTS

WO 2018/112514 A1 6/2018
WO 2020/260862 A1 12/2020

OTHER PUBLICATIONS

International Search Report and Written Opinion in related international application PCT/US2022/049724 issued on Feb. 27, 2023.
(Continued)

*Primary Examiner* — Manuel L Barbee
(74) *Attorney, Agent, or Firm* — POLSINELLI PC

(57) ABSTRACT

Described are techniques for image processing. For instance, a process can include obtaining a plurality of labeled input images and determining a threshold percentage associated with the plurality of labeled input images, indicative of a percentage of correctly labeled input images. The process can include determining a respective self-influence for each respective labeled input image included in the plurality of input images and generating a respective self-influence weight for each respective labeled input image, based on the respective self-influence and the threshold percentage associated with each respective labeled input image. The process can include determining one or more loss values using a loss function associated with training a machine learning network based on using the plurality of labeled input images as a training data set, wherein the loss function determines the one or more loss values based on weighting each respective labeled input image by its respective self-influence weight.

20 Claims, 6 Drawing Sheets

(58) Field of Classification Search
CPC .......... G06N 3/09; G06N 3/084; G06V 10/70; G06V 10/764; G06T 2207/20081
See application file for complete search history.

(56) References Cited

U.S. PATENT DOCUMENTS

| | | | | |
|---|---|---|---|---|
| 2019/0130573 | A1 | 5/2019 | Xu et al. | |
| 2020/0012895 | A1* | 1/2020 | Zhao | G16H 30/40 |
| 2021/0103829 | A1* | 4/2021 | Barshan | G06N 20/10 |
| 2021/0374936 | A1* | 12/2021 | Koopman | G06F 18/214 |

OTHER PUBLICATIONS

Pruthi, et al. "Estimating Training Data Influence by Tracing Gradient Descent" Nov. 14, 2020 [retrieved Mar. 2, 2023 from internet https://arxiv.org/pdf/2002.08484.pdf.
International Preliminary Report on Patentability in related international application PCT/US2022/049724 issued on May 2, 2024.

* cited by examiner

RE-WEIGHTED SELF-INFLUENCE FOR LABELING NOISE REMOVAL IN MEDICAL IMAGING DATA

CROSS-REFERENCE TO RELATED APPLICATIONS

This application claims the benefit of priority to U.S. Provisional Patent Application No. 63/278,879 filed Nov. 12, 2021 and entitled "RE-WEIGHTED SELF-INFLUENCE FOR LABELING NOISE REMOVAL IN MEDICAL IMAGING DATA," the disclosure of which is herein incorporated by reference in its entirety.

TECHNICAL FIELD

The present disclosure pertains to automated pathology detection in medical imaging, and more specifically pertains to improved accuracy in generating filtered and/or weighted training data by removing labeling noise in medical imaging data.

BACKGROUND

Pathology detection and grading processes are often performed in the context of medical and/or diagnostic imaging. For example, an MRI or other medical image can be reviewed for any pathologies that are present (e.g., central canal stenosis of the lumbar spine) and a severity grade can then be assigned to each detected pathology (e.g., on a 1-3 or other scale). However, pathology detection and grading processes are often prone to labeling errors and other inconsistencies, which can be problematic not only in terms of the quality of the immediate diagnoses and medical care rendered, but also in terms of the quality of training data that can be generated from the labeled/graded pathology data. In some cases, these labeling errors and other inconsistencies associated with pathology detection and grading can be referred to as "labeling noise".

For example, labeling noise and high inter-rater variabilities are commonly observed in severity grading for central canal stenosis pathologies detected in lumbar spine MRI images, even among board-certified sub-specialty radiologists (e.g., those who might be considered the most qualified to perform such grading). One approach to identify and correct labeling errors is to have one or more additional radiologists re-read all the graded cases, wherein the additional radiologists are selected to have similar or higher qualifications than the original radiologist who graded each case. However, such approaches often demand substantial amounts of time and effort from radiologists or other high-level experts and are generally very costly. Accordingly, it would be desirable to provide systems and methods for an automated filtering technique to identify labeling errors and only present secondary reviewing radiologists with cases determined to have a high probability of labeling noise.

SUMMARY

Systems, apparatuses, processes (also referred to as methods), and computer-readable media (collectively referred to as "systems and techniques") are described herein that can be used to provide improved accuracy for removing labeling noise in medical imaging. For example, the systems and techniques can be used to identify labeling noise based on determining a self-influence associated with one or more input images (e.g., medical imaging). In some examples, the self-influence determination(s) can be used to filter and/or re-weight labeled medical imaging data. Based on the filtering and/or re-weighting, the resulting set of labeled medical image data can be used to re-train one or more machine learning networks or models. For example, the filtered and/or re-weighted medical image data generated using the systems and techniques described herein can be used to re-train a machine learning model to perform one or more visual perception tasks (e.g., object detection, classification, semantic segmentation, etc.) for medical imaging data inputs.

In some examples, systems and techniques are described that can be used to provide improved accuracy for removing labeling noise in medical imaging. For example, the systems and techniques can be used to identify labeling noise based on determining a self-influence associated with one or more input images (e.g., medical imaging). In some examples, the self-influence determination(s) can be used to filter and/or re-weight labeled medical imaging data. Based on the filtering and/or re-weighting, the resulting set of labeled medical image data can be used to re-train one or more machine learning networks or models. For example, the filtered and/or re-weighted medical image data generated using the systems and techniques described herein can be used to re-train a machine learning model to perform one or more visual perception tasks (e.g., object detection, classification, semantic segmentation, etc.) for medical imaging data inputs.

According to at least one illustrative example, a method is provided, the method comprising: obtaining a plurality of labeled input images; determining a threshold percentage associated with the plurality of labeled input images, wherein the threshold percentage is indicative of a percentage of labeled input images that are correctly labeled; determining a respective self-influence for each respective labeled input image included in the plurality of input images; generating a respective self-influence weight for each respective labeled input image, based on the respective self-influence and the threshold percentage associated with each respective labeled input image; and determining one or more loss values using a loss function associated with training a machine learning network based on using the plurality of labeled input images as a training data set, wherein the loss function determines the one or more loss values based on weighting each respective labeled input image by its respective self-influence weight.

In another example, an apparatus for is provided that includes a memory (e.g., configured to store data, such as virtual content data, one or more images, etc.) and one or more processors (e.g., implemented in circuitry) coupled to the memory. The one or more processors are configured to and can: obtain a plurality of labeled input images; determine a threshold percentage associated with the plurality of labeled input images, wherein the threshold percentage is indicative of a percentage of labeled input images that are correctly labeled; determine a respective self-influence for each respective labeled input image included in the plurality of input images; generate a respective self-influence weight for each respective labeled input image, based on the respective self-influence and the threshold percentage associated with each respective labeled input image; and determine one or more loss values using a loss function associated with training a machine learning network based on using the plurality of labeled input images as a training data set, wherein the loss function determines the one or more loss values based on weighting each respective labeled input image by its respective self-influence weight.

In another example, a non-transitory computer-readable medium is provided that has stored thereon instructions that, when executed by one or more processors, cause the one or more processors to: obtain a plurality of labeled input images; determine a threshold percentage associated with the plurality of labeled input images, wherein the threshold percentage is indicative of a percentage of labeled input images that are correctly labeled; determine a respective self-influence for each respective labeled input image included in the plurality of input images; generate a respective self-influence weight for each respective labeled input image, based on the respective self-influence and the threshold percentage associated with each respective labeled input image; and determine one or more loss values using a loss function associated with training a machine learning network based on using the plurality of labeled input images as a training data set, wherein the loss function determines the one or more loss values based on weighting each respective labeled input image by its respective self-influence weight.

In another example, an apparatus is provided, the apparatus including: means for obtaining a plurality of labeled input images; means for determining a threshold percentage associated with the plurality of labeled input images, wherein the threshold percentage is indicative of a percentage of labeled input images that are correctly labeled; means for determining a respective self-influence for each respective labeled input image included in the plurality of input images; generating a respective self-influence weight for each respective labeled input image, based on the respective self-influence and the threshold percentage associated with each respective labeled input image; and means for determining one or more loss values using a loss function associated with training a machine learning network based on using the plurality of labeled input images as a training data set, wherein the loss function determines the one or more loss values based on weighting each respective labeled input image by its respective self-influence weight.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. The use of a same reference numbers in different drawings indicates similar or identical items or features. Understanding that these drawings depict only exemplary embodiments of the disclosure and are not therefore to be considered to be limiting of its scope, the principles herein are described and explained with additional specificity and detail through the use of the accompanying drawings in which.

DETAILED DESCRIPTION

Figure 1:
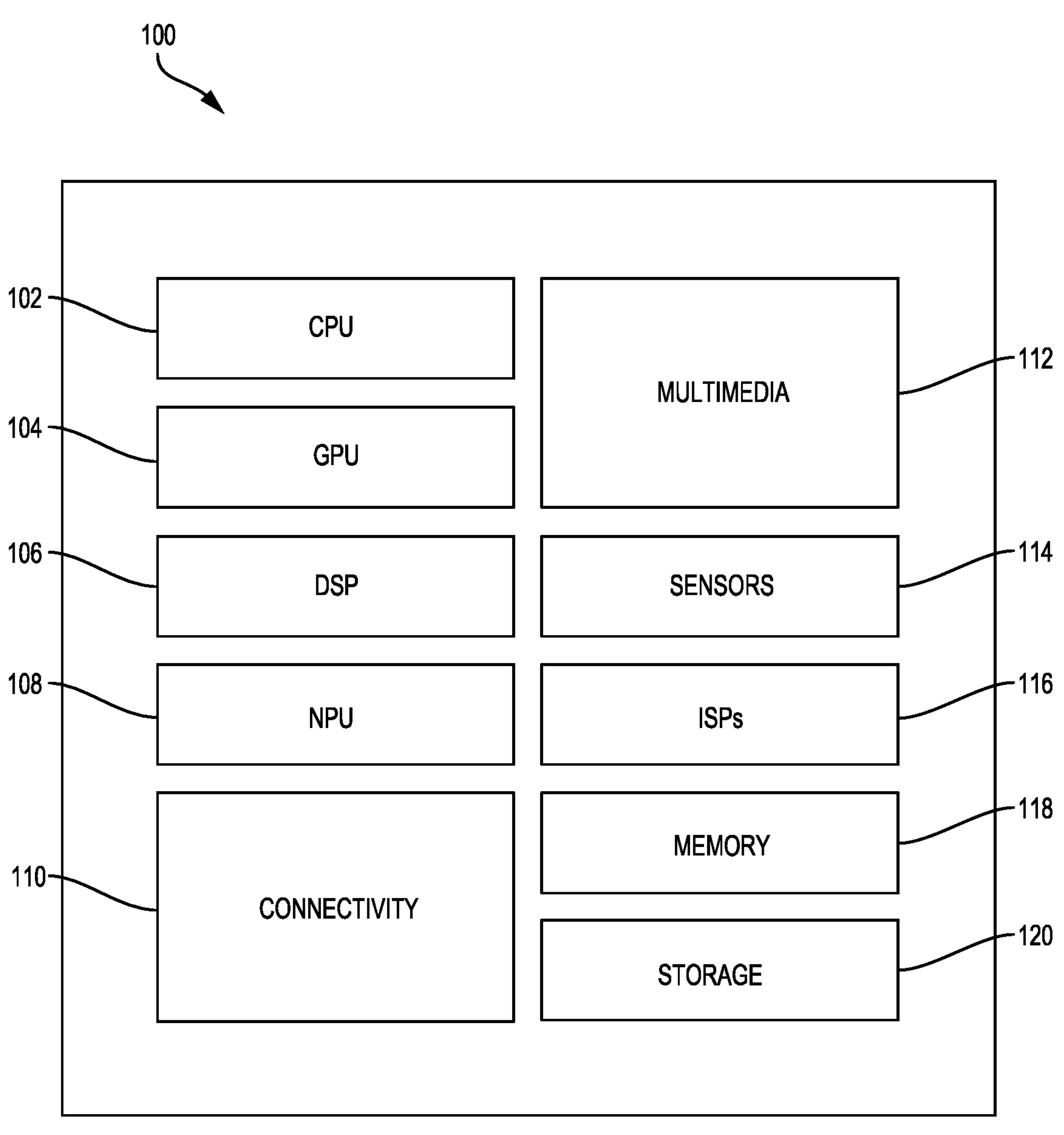
FIG. 1 illustrates an example image processing system which can implement aspects of the systems and techniques described herein, in accordance with some examples.

Various embodiments of the disclosure are discussed in detail below. While specific implementations are discussed, it should be understood that this is done for illustration purposes only. A person skilled in the relevant art will recognize that other components and configurations may be used without departing from the spirit and scope of the disclosure. Additional features and advantages of the disclosure will be set forth in the description which follows, and in part will be obvious from the description, or can be learned by practice of the herein disclosed principles. It will be appreciated that for simplicity and clarity of illustration, where appropriate, reference numerals have been repeated among the different figures to indicate corresponding or analogous elements. The description is not to be considered as limiting the scope of the embodiments described herein.

As mentioned previously, pathology detection and grading processes are often prone to labeling errors and other inconsistencies (also collectively referred to as "labeling noise"), even when provided by highly qualified radiologists or medical professionals. Given that medical imaging labeling is subject to potentially significant amounts of label ambiguity, there is a need to find mislabeled training samples in order to improve the training process and the subsequent performance of trained models. There is a further need to identify and/or correct labeling errors automatically, without discarding samples from the input data set (e.g., without discarding rare, but correctly labeled representations).

Systems, apparatuses, processes (also referred to as methods), and computer-readable media (collectively referred to as "systems and techniques") are described herein that can be used to provide improved accuracy for removing labeling noise in medical imaging. For example, the systems and techniques can be used to identify labeling noise based on determining a self-influence associated with one or more input images (e.g., medical imaging). In some examples, the self-influence determination(s) can be used to filter and/or re-weight labeled medical imaging data. Based on the filtering and/or re-weighting, the resulting set of labeled medical image data can be used to re-train one or more machine learning networks or models. For example, the filtered and/or re-weighted medical image data generated using the systems and techniques described herein can be used to re-train a machine learning model to perform one or more visual perception tasks (e.g., object detection, classification, semantic segmentation, etc.) for medical imaging data inputs.

In one illustrative example, the self-influence determined for a plurality of labeled medical images (e.g., included in an input labeled medical imaging data) can be used as a metric and ranking function, as will be described in greater depth below. In some aspects, by ranking and re-weighting the labeled medical images based on their respective self-influence determinations, the systems and techniques can improve the accuracy of the resulting training data set and can improve the accuracy and performance of one or more machine learning models trained based on the resulting data set. For example, by using self-influence as a ranking and re-weighting metric, all of the medical images included in a given input set of medical imaging data can be kept (e.g., are also included in the resulting, re-weighted set of medical imaging data), including rare but correctly labeled representations that may otherwise have been discarded using existing filtering approaches. Additionally, by performing soft weighting of the training samples (e.g., medical images) rather than using a hard threshold, sensitivity to cutline choice can be reduced and/or minimized.

In some aspects, based on one or more identifications of labeling noise, low weights can be assigned to potentially noisy samples during training. In some embodiments, the systems and methods disclosed herein for removing labeling noise can be applied to samples of training data that comprise medical or diagnostic images labeled with pathology detection and/or grading information, although it is appreciated that various other types of information and information sources can be utilized without departing from the scope of the present disclosure. In some examples, the removal of labeling noise can include reweighing and/or filtering an input of training samples based on self-influence levels calculated for the input training samples, wherein self-influence is utilized as a metric and ranking function, as will be described in greater depth below. In some aspects, self-influence levels can be used to calculate and assign low weights to potentially noisy samples during a training process. For example, the resulting filtered and/or reweighted training samples can be utilized to train (or re-train) one or more deep learning networks, neural networks or models, machine learning networks or models, etc., as will also described in greater depth below.

In some aspects, the re-weighing and/or calculation of self-influence levels can be seen to provide significantly improved performance over existing techniques. For example, the presently disclosed systems and techniques can be seen to provide improved performance for lumbar spine stenosis detection in MRI imaging, with a macro accuracy of 77.2%, compared to a baseline accuracy of 75.4%. Moreover, it is further noted that the presently disclosed systems and techniques for reweighting training data based on self-influence can be agnostic to the choice of training model(s). Accordingly, the systems and techniques described here may be applied across various different deep learning approaches and/or machine learning approaches without departing from the scope of the present disclosure.

Further aspects of the systems and techniques will be described with respect to the figures.

FIG. 1 illustrates an example implementation of an image processing system 100 that, in some cases, can be used to implement the systems and techniques described herein. The image processing system 100 can include a central processing unit (CPU) 102 or a multi-core CPU, configured to perform one or more of the functions described herein. Parameters or variables (e.g., neural signals and synaptic weights), system parameters associated with a computational device (e.g., neural network with weights), delays, frequency bin information, task information, image data, among other information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a memory block 118, and/or may be distributed across multiple blocks. Instructions executed at the CPU 102 may be loaded from a program memory associated with the CPU 102 and/or from a memory block 118.

The image processing system 100 can also include additional processing blocks for performing specific functions, such as a GPU 104; a DSP 106; a connectivity block 110, which may include fifth generation (5G) connectivity, fourth generation long term evolution (4G LTE) connectivity, Wi-Fi connectivity, USB connectivity, Bluetooth connectivity, and the like; and/or a multimedia processor 112 that may, for example, detect image features. In some examples, the NPU 108 can be implemented in the CPU 102, DSP 106, and/or GPU 104. In some cases, the image processing system 100 may also include one or more sensor 114, one or more image signal processors (ISPs) 116, and/or storage 120.

In some examples, the image processing system 100 can implement an ARM instruction set architecture for one or more processors. In an aspect of the present disclosure, the instructions loaded into the CPU 102 may include code to search for a stored multiplication result in a lookup table (LUT) corresponding to a multiplication product of an input value and a filter weight. The instructions loaded into the CPU 102 may also include code to disable a multiplier during a multiplication operation of the multiplication product when a lookup table hit of the multiplication product is detected. In addition, the instructions loaded into the CPU 102 may include code to store a computed multiplication product of the input value and the filter weight when a lookup table miss of the multiplication product is detected.

The image processing system 100 can be part of a computing device or multiple computing devices. In some examples, the image processing system 100 can be part of an electronic device (or devices) such as a camera system (e.g., a digital camera, an IP camera, a video camera, a security camera, etc.), a telephone system (e.g., a smartphone, a cellular telephone, a conferencing system, etc.), a desktop computer, an XR device (e.g., a head-mounted display, etc.), a smart wearable device (e.g., a smart watch, smart glasses, etc.), a laptop or notebook computer, a tablet computer, a set-top box, a television, a display device, a system-on-chip (SoC), a digital media player, a gaming console, a video streaming device, a server, a drone, a computer in a car, an Internet-of-Things (IoT) device, or any other suitable electronic device(s).

In some implementations, the CPU 102, the GPU 104, the DSP 106, the NPU 108, the connectivity block 110, the multimedia processor 112, the one or more sensors 114, the ISPs 116, the memory block 118 and/or the storage 120 can be part of the same computing device. For example, in some cases, the CPU 102, the GPU 104, the DSP 106, the NPU 108, the connectivity block 110, the multimedia processor 112, the one or more sensors 114, the ISPs 116, the memory block 118 and/or the storage 120 can be integrated into a smartphone, laptop, tablet computer, smart wearable device, video gaming system, server, and/or any other computing device. In other implementations, the CPU 102, the GPU 104, the DSP 106, the NPU 108, the connectivity block 110, the multimedia processor 112, the one or more sensors 114, the ISPs 116, the memory block 118 and/or the storage 120 can be part of two or more separate computing devices.

The image processing system 100 and/or components thereof may be configured to perform video compression and/or decompression (also referred to as video encoding and/or decoding, collectively referred to as video coding) using techniques according to aspects of the present disclosure discussed herein. By using deep learning architectures and the techniques described herein to perform video compression and/or decompression, aspects of the present disclosure can increase the efficiency of video compression and/or decompression on a device and/or reduce associated resource requirements and/or usage. For example, a device using the video coding techniques described herein can compress video data more efficiently, can reduce the amount of data transmitted in compressed video data to a destination device, and the destination device can receive and decompress the compressed video data efficiently. In some examples, the deep learning architectures and techniques described herein can reduce the amount of data exchanged between coding devices or components, such as encoders and decoders, to code video content. The reduced amount of data transmitted for video coding can reduce latencies, increase performance, and reduce the cost or burden on computing resources such as, for example, bandwidth, memory, storage, power, compute, hardware, etc.

As noted above, a neural network is an example of a machine learning system, and can include an input layer, one or more hidden layers, and an output layer. Data is provided from input nodes of the input layer, processing is performed by hidden nodes of the one or more hidden layers, and an output is produced through output nodes of the output layer. Deep learning networks typically include multiple hidden layers. Each layer of the neural network can include feature maps or activation maps that can include artificial neurons (or nodes). A feature map can include a filter, a kernel, or the like. The nodes can include one or more weights used to indicate an importance of the nodes of one or more of the layers. In some cases, a deep learning network can have a series of many hidden layers, with early layers being used to determine simple and low-level characteristics of an input, and later layers building up a hierarchy of more complex and abstract characteristics.

A deep learning architecture may learn a hierarchy of features. If presented with visual data, for example, the first layer may learn to recognize features, such as edges, in the input stream. In another example, if presented with auditory data, the first layer may learn to recognize spectral power in specific frequencies. The second layer, taking the output of the first layer as input, may learn to recognize features, such as shapes for visual data or combinations of sounds for auditory data. For instance, higher layers may learn to represent complex shapes in visual data or words in auditory data. Still higher layers may learn to recognize common visual objects and/or spoken phrases.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 2A:
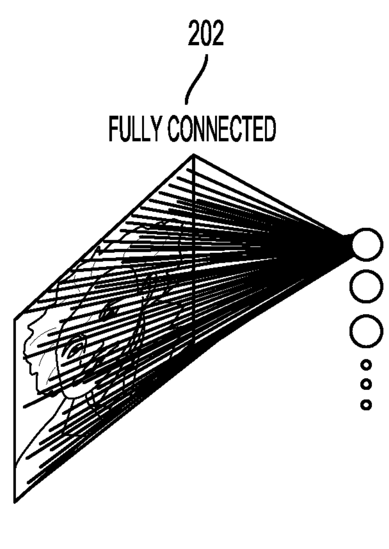
FIG. 2A illustrates an example of a fully connected neural network, in accordance with some examples.
Figure 2B:
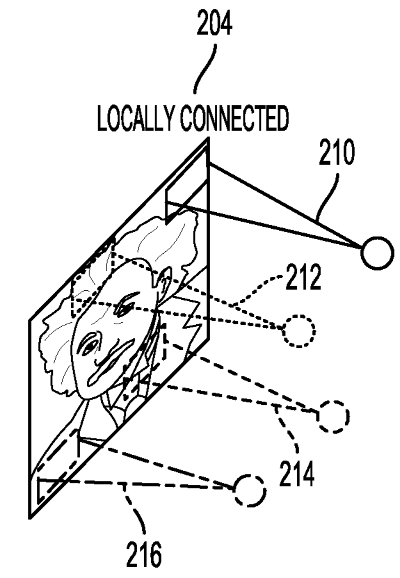
FIG. 2B illustrates an example of a locally connected neural network, in accordance with some examples.

The connections between layers of a neural network may be fully connected or locally connected. FIG. 2A illustrates an example of a fully connected neural network 202. In a fully connected neural network 202, a neuron in a first hidden layer may communicate its output to every neuron in a second hidden layer, so that each neuron in the second layer will receive input from every neuron in the first layer. FIG. 2B illustrates an example of a locally connected neural network 204. In a locally connected neural network 204, a neuron in a first hidden layer may be connected to a limited number of neurons in a second hidden layer. More generally, a locally connected layer of the locally connected neural network 204 may be configured so that each neuron in a layer will have the same or a similar connectivity pattern, but with connections strengths that may have different values (e.g., 210, 212, 214, and 216). The locally connected connectivity pattern may give rise to spatially distinct receptive fields in a higher layer, because the higher layer neurons in a given region may receive inputs that are tuned through training to the properties of a restricted portion of the total input to the network.

Figure 2C:
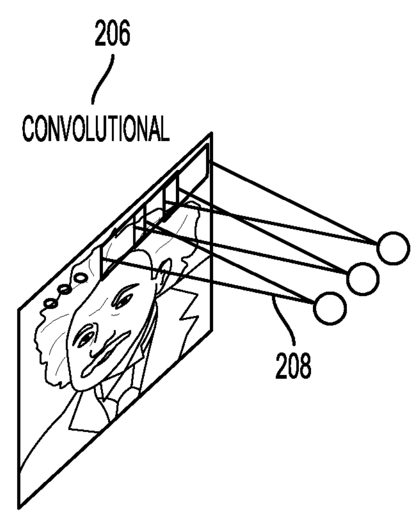
FIG. 2C illustrates an example of a convolutional neural network, in accordance with some examples.

One example of a locally connected neural network is a convolutional neural network. FIG. 2C illustrates an example of a convolutional neural network 206. The convolutional neural network 206 may be configured such that the connection strengths associated with the inputs for each neuron in the second layer are shared (e.g., 208). Convolutional neural networks may be well suited to problems in which the spatial location of inputs is meaningful. Convolutional neural network 206 may be used to perform one or more aspects of video compression and/or decompression, according to aspects of the present disclosure.

Figure 2D:
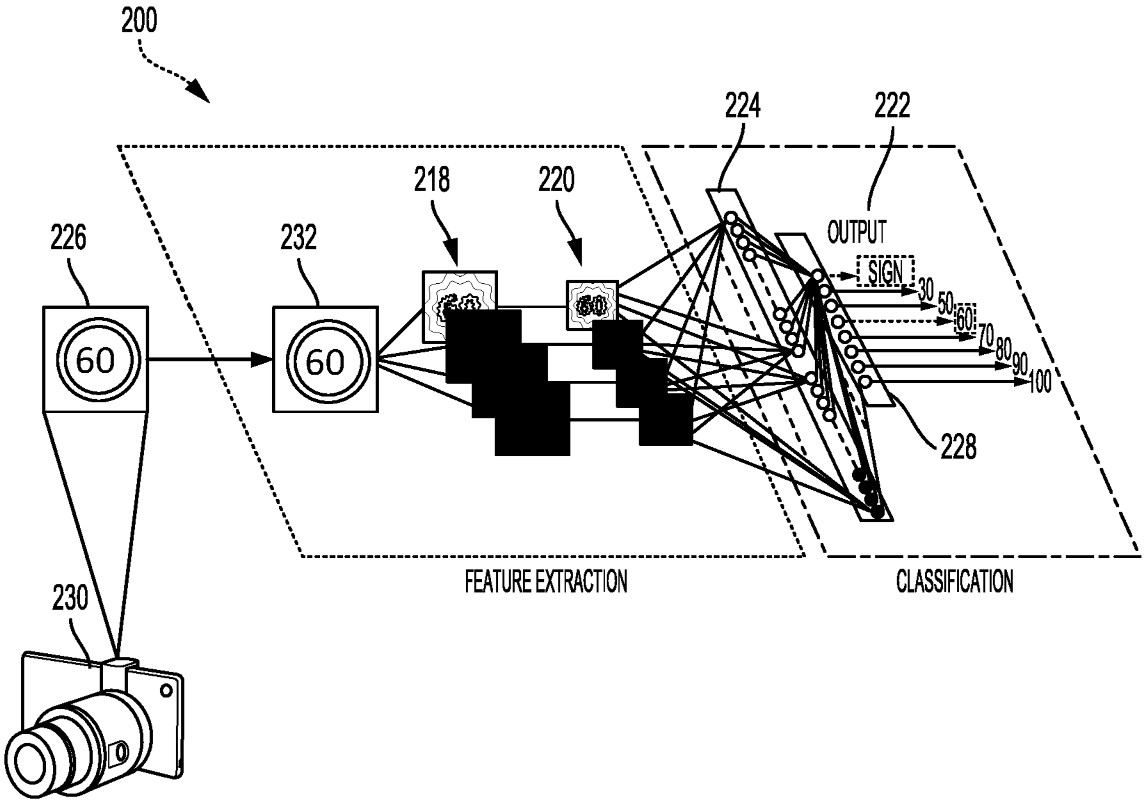
FIG. 2D illustrates a detailed example of a deep convolutional network (DCN) that can be used to recognize features from an image, in accordance with some examples.

One type of convolutional neural network is a deep convolutional network (DCN). FIG. 2D illustrates an example of a DCN 200 designed to recognize features from an image 226 input from an image capturing device 230, such as a camera or image sensor. In some examples, the DCN 200 of the current example may be trained to identify visual features in the image 226, such as one or more objects or signs in the image 226, for example.

In some examples, the DCN 200 may be trained with supervised learning. During training, the DCN 200 may be presented with an image, such as the image 226, and a forward pass may then be computed to produce an output 222. The DCN 200 may include a feature extraction section and a classification section. Upon receiving the image 226, a convolutional layer 232 may apply convolutional kernels (not shown) to the image 226 to generate a first set of feature maps 218. As an example, the convolutional kernel for the convolutional layer 232 may be a 5×5 kernel that generates 28×28 feature maps. In the present example, because four different feature maps are generated in the first set of feature maps 218, four different convolutional kernels were applied to the image 226 at the convolutional layer 232. The convolutional kernels may also be referred to as filters or convolutional filters.

The first set of feature maps 218 may be subsampled by a max pooling layer (not shown) to generate a second set of feature maps 220. The max pooling layer reduces the size of the first set of feature maps 218. That is, a size of the second set of feature maps 220, such as 14×14, is less than the size of the first set of feature maps 218, such as 28×28. The reduced size provides similar information to a subsequent layer while reducing memory consumption. The second set of feature maps 220 may be further convolved via one or more subsequent convolutional layers (not shown) to generate one or more subsequent sets of feature maps (not shown).

In the example of FIG. 2D, the second set of feature maps 220 is convolved to generate a first feature vector 224. Furthermore, the first feature vector 224 is further convolved to generate a second feature vector 228. Each feature of the second feature vector 228 may include a number that corresponds to a possible feature of the image 226, such as "sign", "60", and "100". A softmax function (not shown) may convert the numbers in the second feature vector 228 to a probability. As such, an output 222 of the DCN 200 is a probability of the image 226 including one or more features.

In the present example, the probabilities in the output 222 for "sign" and "60" are higher than the probabilities of the others of the output 222, such as "30", "40", "50", "70", "80", "90", and "100". Before training, the output 222 produced by the DCN 200 is likely to be incorrect. Thus, an error may be calculated between the output 222 and a target output. The target output is the ground truth of the image 226 (e.g., "sign" and "60"). The weights of the DCN 200 may then be adjusted so the output 222 of the DCN 200 is more closely aligned with the target output.

To adjust the weights, a learning algorithm may compute a gradient vector for the weights. The gradient may indicate an amount that an error would increase or decrease if the weight were adjusted. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level. After learning, the DCN may be presented with new images and a forward pass through the network may yield an output 222 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs can achieve high performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less than, for example, that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer, with each element of the feature map (e.g., 220) receiving input from a range of neurons in the previous layer (e.g., feature maps 218) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction.

Figure 3:
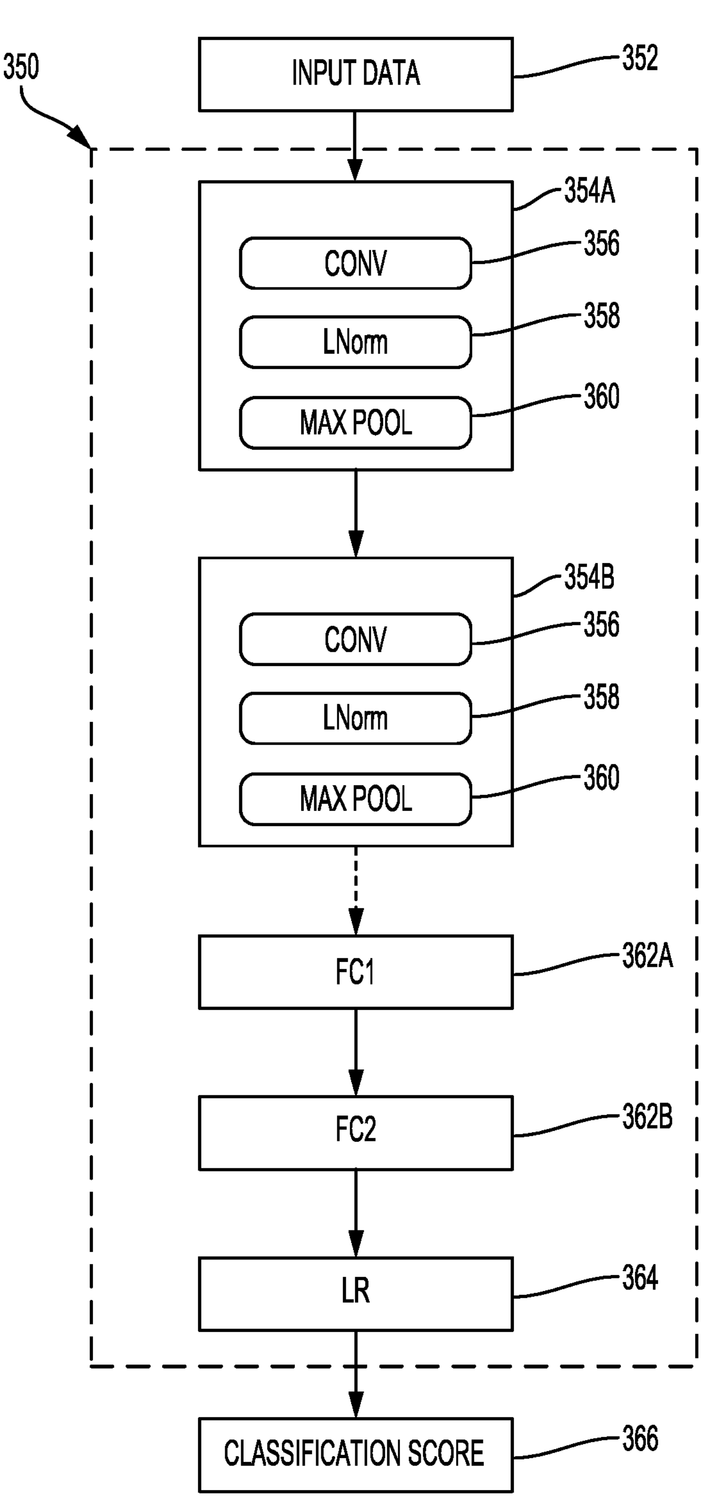
FIG. 3 is a block diagram illustrating another example DCN, in accordance with some examples.

FIG. 3 is a block diagram illustrating an example of a deep convolutional network 350. The deep convolutional network 350 may include multiple different types of layers based on connectivity and weight sharing. As shown in FIG. 3, the deep convolutional network 350 includes the convolution blocks 354A, 354B. Each of the convolution blocks 354A, 354B may be configured with a convolution layer (CONV) 356, a normalization layer (LNorm) 358, and a max pooling layer (MAX POOL) 360.

The convolution layers 356 may include one or more convolutional filters, which may be applied to the input data 352 to generate a feature map. Although only two convolution blocks 354A, 354B are shown, the present disclosure is not so limiting, and instead, any number of convolution blocks (e.g., blocks 354A, 354B) may be included in the deep convolutional network 350 according to design preferences. The normalization layer 358 may normalize the output of the convolution filters. For example, the normalization layer 358 may provide whitening or lateral inhibition. The max pooling layer 360 may provide down sampling aggregation over space for local invariance and dimensionality reduction.

The parallel filter banks, for example, of a deep convolutional network may be loaded on a CPU 102 or GPU 104 of an image processing system 100 to achieve high performance and low power consumption. In some examples, the parallel filter banks may be loaded on the DSP 106 or an ISP 116 of an image processing system 100. The deep convolutional network 350 may access other processing blocks that may be present on the image processing system 100.

The deep convolutional network 350 may include one or more fully connected layers, such as layer 362A (labeled "FC1") and layer 362B (labeled "FC2"). The deep convolutional network 350 may include a logistic regression (LR) layer 364. Between each layer 356, 358, 360, 362, 364 of the deep convolutional network 350 are weights (not shown) that are to be updated. The output of each of the layers (e.g., 356, 358, 360, 362, 364) may serve as an input of a succeeding one of the layers (e.g., 356, 358, 360, 362, 364) in the deep convolutional network 350 to learn hierarchical feature representations from input data 352 (e.g., images, audio, video, sensor data and/or other input data) supplied at the first of the convolution blocks 354A. The output of the deep convolutional network 350 is a classification score 366 for the input data 352. The classification score 366 may be a set of probabilities, where each probability is the probability of the input data including a feature from a set of features.

Another type of neural network is an autoencoder. An autoencoder can be trained (e.g., using training data and one or more loss functions) to receive input and to generate a version of that input at its output (e.g., to essentially copy its input to its output). An autoencoder can be trained to learn efficient data codings in an unsupervised manner. For example, given an image of an object, an autoencoder can first encode the image into a lower dimensional latent representation, and can then decode the latent representation back to an image of the object. An autoencoder can learn (e.g., through training) to compress the input data while minimizing the reconstruction error.

As mentioned previously, systems and techniques are described herein that can be used to provide improved accuracy training data. In one illustrative example, the systems and techniques can be used to provide improved accuracy for removing labeling noise in medical imaging and generated improved training data therein. In some aspects, an improved training data set can be generated based on one or more self-influence values that are determined for an input training data set.

For example, one or more self-influence values can be determined for each respective medical image included in a given input training data set, wherein the input training data set includes a plurality of medical images. In some aspects, the input training data set can include a plurality of labeled medical images. Self-influence can be determined based on how much a given training sample reduces (or otherwise changes) its own loss during training, for example by calculating a self-influence value for each sample based on the measure. As will be described in greater depth below, the systems and techniques can use the determined self-influence values to filter and/or reweight at least a portion of the training samples to thereby generate an improved training data set with reduced labeling noise. In some embodiments, each given training sample can be assigned a weight in the loss calculation, where the assigned weight of a given training sample is based on the self-influence calculated for the given training sample. This process of weighting and/or re-weighting input training data based on ranked self-influence calculations is seen to provide a significant improvement in performance over a baseline training process using the input training data set.

In an illustrative example, an input training data set can include a plurality of training data samples (e.g., also referred to herein as "training samples" and "training examples"), where one or more training samples of the plurality of training samples are medical images labeled with corresponding pathology and/or severity grade(s). The pathology and severity grades used as labels can be generated manually (e.g., by one or more reviewing radiologists) and/or automatically (see e.g., commonly owned U.S. patent application Ser. No. 16/849,42, the disclosure of which is herein incorporated by reference in its entirety).

In general, self-influence can be used to measure the influence of a particular training sample on a subsequent prediction generated by a trained model (e.g., a machine learning network or model that is trained using a training set that includes the training sample). In other words, self-influence can be used to trace how the loss on a given test point (e.g., the subsequent prediction) changes during the training process whenever a particular training sample is used. In some embodiments, the self-influence of a particular training sample z on a test sample z' can be determined as the total reduction in training loss on test sample z' that is induced by the training process whenever training sample z is utilized.

In some aspects, self-influence can be approximated for a small learning rate by summing the dot product of the loss gradient of the training sample (z) with the loss gradient of the test sample (z) across several checkpoints. A checkpoint can be associated with an existing or baseline training procedure (e.g., a standard or reference training procedure). For example, checkpoints can be generated by obtaining and storing the current parameters of a machine learning model at regular intervals during the baseline/reference training procedure. In one illustrative example, for a given set of K checkpoints $\{\theta_k: k=1, \ldots, K\}$ and for a given loss function l, a Tracln self-influence score can be calculated as:

$$TracIn(z, z') = \sum_{k=1}^{K} \nabla l(\theta_k, z') \cdot \nabla l(\theta_k, z) \quad \text{Eq. (1)}$$

Here, z represents a given training sample and z' represents the corresponding test sample when the training sample z is used during training. As noted above, K represents the set of checkpoints $\{\theta_k: k=1, \ldots, K\}$, and l is the loss function used during training. In some aspects, changes (e.g., reductions) to the test sample loss z' can be tracked over a single training instance or iteration. Changes to the test sample loss z' can additionally, or alternatively, be tracked over multiple training instances or iterations and/or may be tracked over some combination of the two.

In one illustrative example, self-influence levels or values can be calculated for a plurality of training samples, with the goal of identifying mislabeled training samples. Subsequently, high self-influence samples can be filtered out or otherwise removed from the resulting filtered training data set, e.g., based on an observation that high self-influence samples represent undesirable labeling noise. For instance, in some cases, samples with a high self-influence may likely be mislabeled, because high self-influence samples are samples that mainly reduced their own loss without the help of other training samples.

In some embodiments, training data filtering can be performed based on one or more pre-determined thresholds, wherein a training sample with a calculated self-influence value that exceeds one or more pre-determined threshold(s) is filtered out. In some cases, training samples with a calculated self-influence value that is below one or more pre-determined thresholds can be actively added to a filtered training data set (e.g., protected from filtering). With high self-influence samples removed (or otherwise re-weighted based on the respective high self-influence values of the high-self influence samples), the filtered training data set can then be used to retrain the underlying model (which, as noted previously, can include but is not limited to one or more deep learning networks, neural networks, machine learning networks, etc.)

However, in some cases it may be difficult to determine appropriate filtering thresholds for removing high self-influence samples from an input training data set, as it is not always the case that every high self-influence sample is mislabeled. For example, a properly labeled training sample might have a high self-influence value because the training sample includes one or more rare representations of various pathologies and/or severity grades—it is often undesirable or counterproductive to remove such training samples. Therefore, filtering on the basis of calculated self-influence values can quickly become too aggressive (e.g., filtering threshold is too low, some correctly labeled training samples are removed but should be kept) or insufficiently aggressive (e.g., filtering threshold is too high, some incorrectly labeled training samples are kept but should be removed).

Accordingly, in some embodiments, the systems and techniques can be used to generate one or more improved training data sets by using calculated self-influence values as a metric and ranking function for reweighing the individual training samples of an input training data set. For example, by selectively reweighing the training samples of an input training data set based on corresponding self-influence values, the presently disclosed systems and techniques for generating improved training data can provide greater granularity and control for reducing labeling noise without also removing correctly labeled training samples (and/or training samples with rare representations).

In some embodiments, the techniques described herein can jointly leverage self-influence as a metric and ranking function to reweigh training samples, as mentioned previously. For example, a percentage p of training data can be determined, such that the percentage p represents those training data samples that may be considered correctly labeled samples. In one illustrative example, samples with a lower or equal self-influence than the $p^{th}$ percentile can be assigned a weight of 1, while one or more (or all) of the remaining (1−p) % of samples can be re-weighted. For example, the remaining (1−p) % of samples can be referred to as high self-influence samples. In some examples, the high self-influence samples can be re-weighted by the ratio of the $p^{th}$-percentile of the self-influence (e.g., the $p^{th}$-percentile self-influence value, $x_p$) to the self-influence x of a sample. It is noted that this re-weighting scheme is provided for purposes of example and illustration and other re-weighting approaches can be utilized without departing from the scope of the present disclosure. In some embodiments, re-weighting based on calculated self-influence values can be performed such that training data samples that are determined to have higher self-influence scores can be assigned lower weights for use in one or more loss calculations.

In an illustrative example, each training data sample of a training data set can be reweighted based at least in part on a weight value $w_{x_p}$:

$$w_{x_p}(x) = \begin{cases} 1, & \text{if } x \leq x_p \\ \frac{x_p}{x}, & \text{if } x > x_p \text{ and } \frac{x_p}{x} < \frac{1}{(\log x/x_p)^2} \\ \frac{1}{(\log x/x_p)^2}, & \text{else} \end{cases} \quad \text{(Eq. 2)}$$

Here, a self-influence value is calculated for each training data sample of the training data set and provided as an input x to the reweighing function $w_{x_p}(x)$. For example, the self-influence values x associated with each training data sample of the training data set can be determined using Eq. (1), as described above. In some examples, a threshold $x_p$ can be equal to the $p^{th}$-percentile self-influence value of the training data set. As illustrated in the example of Eq. (2), the threshold $x_p$ can be used to provide a piecewise definition of the weight values $w_{x_p}$ that can be applied to the input training data samples.

In some embodiments, the percentage p can be determined, estimated, or calculated such that p represents the percentage of input training samples that are considered to be correctly labeled. For example, if p=0.75 (e.g., indicating that 75% of training samples are considered correctly labeled), then $x_p$ can be set equal to the $75^{th}$ percentile self-influence value. In some aspects, one or more values for the percentage p can be determined empirically and/or stored as a pre-determined value. In some examples, a p value can be determined based at least in part on prior knowledge or observations of a particular application that a model is trained for. Various degrees of granularity can additionally, or alternatively, be utilized in determining p (and therefore $x_p$) without departing from the scope of the present disclosure. In other words, different p values can be determined for multiple different groupings of training data samples and/or training data sets (a parent training data set being only one example of a grouping of individual training data samples). For example, p can be determined or estimated across some or all samples of an individual training data set, some or all samples of multiple training data sets, and/or all available training data sets; across training data sets associated with certain pathologies and/or types of medical images; across training samples with labels corresponding to individual radiologists, groups of radiologists, and/or medical practice groups and entities; across training samples obtained in a specified time period or from a specified medical practice location; across individual or constituent classes of labeled training samples; etc.

With respect to Eq. (2), when the calculated self-influence value x for a given training sample is less than or equal to the self-influence threshold value $x_p$, the given training sample can be assigned a weight of 1, e.g., $w_{x_p}(x)=1$ for $x \leq x_p$. Because $x_p$ is a percentile value corresponding to the selected percentage p of training samples that are considered correctly labeled, it can be seen that p % of the input training samples are assigned a weight of 1 and used normally, e.g., without any weight reduction.

The remaining (1−p) % of input training samples can receive a smaller weight. These are the input training samples with a calculated self-influence value that is greater than the self-influence threshold $x_p$, e.g., the training samples where $x > x_p$. Recalling the previous discussion of self-influence, it can be seen that these high self-influence training samples may have an excessive impact on the prediction(s) generated by the trained deep learning, neural network, and/or machine learning model that is trained using a training data set that includes the high self-influence samples. Advantageously, the reduced weightings calculated according to Eq. (2) can result in improved training data sets because many of the high self-influence training samples correspond to undesirable labeling noise—with the presently disclosed reduced weightings, the negative impact or error introduced by labeling noise can be significantly reduced if not eliminated entirely.

In particular, and as provided in Eq. (2), a piecewise weighting reduction can be applied to these high self-influence valued training samples with $x>x_p$, which can be utilized to more selectively mitigate the situation described previously in which strict threshold-based filtering may be inappropriate. For example, some high self-influence samples may represent labeling noise and should be removed or significantly decreased in weight, while some high self-influence samples may be correctly labeled and therefore should not be removed (e.g., such as when the training sample is correctly labeled but has a high self-influence value because it contains a rare representation).

As seen in Eq. (2), two different weight reduction calculations are provided, although it is appreciated that a greater or lesser number of weight reduction calculations can be utilized without departing from the scope of the present disclosure. For example, it is also possible for the weight value $w_{x_p}(x)$ to be calculated as the ratio $$\frac{x_p}{x} \text{ for all } x > x_p$$

(e.g., in some embodiments, the "else" condition and associated weight value calculated as $$\frac{1}{\left(\log \frac{x}{x_p}\right)^2}$$

can be omitted from Eq. (2)).

Additionally, one or more of the weight reduction calculations can be configured to be more or less aggressive than in the two examples of Eq. (2) in terms of the degree of weight reduction that is applied to the high self-influence training samples, again without departing from the scope of the present disclosure.

In the specific example of Eq. (2), for high self-influence training samples with $$x > x_p \text{ and } \frac{x_p}{x} < \frac{1}{\left(\log \frac{x}{x_p}\right)^2},$$

a reduced weight value (also referred to as a "reweighed value" or a "reweighted value") can be calculated as $$\frac{x_p}{x}.$$

The remaining high self-influence training samples (e.g., where $$\frac{x_p}{x} > \frac{1}{\left(\log \frac{x}{x_p}\right)^2}$$

can be assigned a reduced weight value calculated as $$\frac{1}{\left(\log \frac{x}{x_p}\right)^2}.$$

In some cases, the transition point(s) between the piecewise definitions of reduced weight value calculations for the high self-influence training samples (e.g., all samples with $x>x_p$) can be selected to ensure that the reduced weight values are neither too large nor too small to be effective. For example, the first reduced weighting $$\frac{x_p}{x}$$

quickly becomes very small for large values of the calculated self-influence x, as in some cases the calculated self-influence x can be several orders of magnitude larger than the self-influence threshold value $x_p$ (e.g., where $x>>x_p$). Similarly, the second reduced weighting $$\frac{1}{\left(\log \frac{x}{x_p}\right)^2}$$

can be too large when the calculated self-influence x is similar in value to the fixed self-influence threshold $x_p$ (e.g., where $x \approx x_p$).

In some embodiments, rather than determining the percentage p to represent the percentage of training samples that are considered to be correctly labeled, a noise level associated with an input training data set and/or input training data samples may be known. In this case, the self-influence threshold percentile $x_p$ can be chosen directly such that $x_p$ is around the known noise level or lower than the known noise level. For example, if there is a known noise level of 25% (e.g., indicating that 25% of training samples are known to contain some labeling noise), then the self-influence threshold percentile $x_p$ can be set at 75%.

As mentioned previously, in some embodiments the presently disclosed techniques for generating reweighted training data samples can be performed individually for each individual class within the labeled training data. For example, reweighted training data samples can be generated individually for each respective class included in the labeled training data input based on different classes having different ranges of self-influence values. Different ranges of self-influence values can cause the value of the self-influence threshold $x_p$ to vary, as it is determined as a fixed percentile (e.g., the $75^{th}$ percentile self-influence value of a first range is not necessarily equal to the $75^{th}$ percentile self-influence value of a second range).

Figure 4:
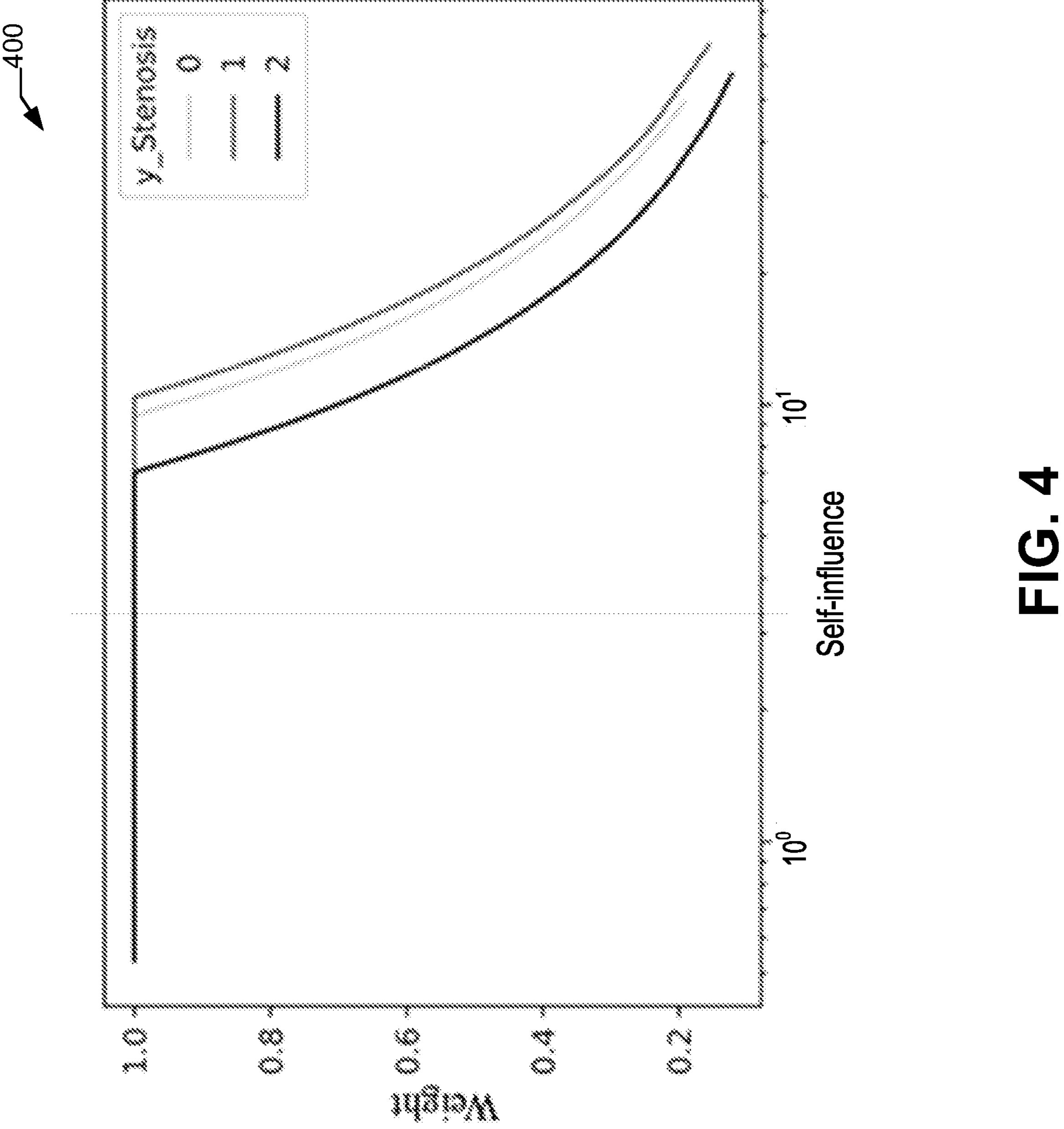
FIG. 4 is an example diagram depicting an example reweighing applied to multiple training data samples from multiple classes, where the reweighing is based on one or more self-influence determinations, in accordance with some examples.

FIG. 4 is an example diagram illustrating a graph 400 that depicts example weight values (e.g., $w_{x_p}(x)$ as given by Eq. (2) and described above) determined for three different classes included in a given training data set of medical images. For example, the vertical (e.g., y-axis) of graph 400 represents the example weight values $w_{x_p}(x)$, while the horizontal (e.g., x-axis) of graph 400 represents the self-influence values x (e.g., determined using Eq. (1), above).

In the particular example of FIG. 4, the input training data set can correspond to a stenosis pathology, with the three classes 0, 1, and 2 corresponding to three different severity grades that can be assigned to the stenosis pathology. In some embodiments, and as depicted in FIG. 4, the weight values on the y-axis can be calculated according to Eq. (2) (and therefore may correspond to $w_{x_p}$). Similarly, the x-axis can correspond to the calculated self-influence values x described above with respect to Eq. (2) and determined using Eq. (1). In some aspects, the calculated self-influence values x can be determined as Tracln self-influence values. Additionally, in the example of FIG. 4, it is noted that 25% of the input training samples for each class (e.g., the three severity grade classes, 0, 1, and 2) are reweighted/assigned a reduced weight value. For example, for each class I, the corresponding self-influence threshold $x_p$ was set equal to the $75^{th}$ percentile self-influence value.

In some embodiments, the weight values $w_{x_p}(x)$ (e.g., also referred to as re-weighting values) can be generated for each input training sample of an input training data set according to Eq. (2) and/or the approach described above. In one illustrative example, the reweighting values $w_{x_p}(x)$ can be generated for each input training sample included in each respective class of an input training data set. For instance, given an input training data set that includes a first subset of training samples corresponding to the first class (e.g., severity grade=0), a second subset of training samples corresponding to the second class (e.g., severity grade=1), and a third subset of training samples corresponding to the third class (e.g., severity grade=2), the systems and techniques can determine three respective sets of reweighting values. For example, the systems and techniques can determine a first set of reweighting values $w_{x_p,1}$ that includes a corresponding reweighting value for each training sample of the first subset; can determine a second set of reweighting values $w_{x_p,2}$ that includes a corresponding reweighting value for each training sample of the second subset; and can determine a third set of reweighting values $w_{x_p,3}$ that includes a corresponding reweighting value for each training sample of the third subset.

In some aspects, the systems and techniques can subsequently determine corresponding reweighted training data samples, based on attaching the weight values to their corresponding training sample (e.g., weighting or reweighing each training sample using its respective/corresponding weight value). The reweighted training data samples can then be used in a loss function calculation that drives or underlies one or more subsequent training and/or re-training processes for the underlying model for which the training sample weight values $w_{x_p}$ were generated. For example, for a given batch of training data samples, $B=\{z_b\}$, with associated self-influence values $x_b$ and a loss function $l(z_b)$, the set of reweighting values $w_{x_p}(\cdot)$ can be used to weight the loss for all samples as given below:

$$l_B=\Sigma_{z_b \in B} w_{x_p}(x_b) l(z_b) \qquad \text{Eq. (3)}$$

Here, $l_B$ represents the cumulative or accumulated loss across all of the training data samples $z_b$ included in the batch B. In some embodiments, the generated weight values $w_{x_p}$ can be used to calculate one or more cross-entropy losses, mean-squared losses, etc. Additionally, or alternatively, the generated weight values $w_{x_p}$ can be applied to any one or more batch(es) during training.

As described above, it has been shown that self-influence can be effectively utilized to identify labeling noise in medical imaging data. For example, calculated self-influence values can be used to find mislabeled or ambiguous training samples and/or data. In one approach, self-influence values can be calculated for an input comprising a plurality of labeled training samples (e.g., a labeled training data set) and used to automatically filter or remove training samples with high self-influence values. However, in some scenarios, using the filtering approach to clean the input training data of high self-influence samples may be insufficient.

In one illustrative example, the systems and techniques can be used to implement an improved approach wherein determined self-influence values are utilized to simultaneously provide a ranking metric and assign one or more weights to the ranked training sample inputs. Advantageously, the ranked and weighted self-influence approach can be seen to address one or more potential shortcomings of the strict filtering approach. For example, the ranked and weighted self-influence implemented by the systems and techniques described herein generated an improved training data set wherein none of the input training samples are removed (e.g., all training samples, including rare but correctly labeled representations, are kept for training). Additionally, the ranked and weighted self-influence implemented by the systems and techniques described herein can implement soft weighting instead of a hard threshold—in some aspects, by applying soft weighting to the input training samples, the sensitivity to cutline choice associated with hard thresholding can be avoided.

Described below is an experimental dataset and training procedure that can be used to obtain example experimental results demonstrating the improved performance of the presently disclosed systems and techniques for improving noisy training data labels, e.g., by performing re-weighting based on self-influence values calculated for the training samples. In the experimental results discussed below (which are provided for purposes of illustration and clarity of explanation), a deep learning model is trained to detect and grade lumbar spinal stenosis (LSS) at each Functional Spinal Unit (FSU) level (e.g., L1-2 through L5-S1). The spinal cord data can be pre-processed to split it into one or more FSUs.

In the experimental data set of the present example, Sagittal T1, Sagittal T2 and Axial T2 sequences from lumbar spine MR exams were collected from 5,348 patients. The magnetic field strength of the data included 3.0 T (16%), 1.5 T (76%), and <1.5 T (7%), with 1% of images having an unknown field strength. Stenosis severity of a given FSU was graded based on Stenotic Ratio:

0-0.25→Grade 0: None/Mild 0.25-0.75→Grade 1: Moderate 0.75-1, Schizas class C and D→Grade 2: Severe In the example data set, at least 1 of 11 experienced musculoskeletal- and neuro-radiologists assigned 22,606 FSUs to Grade 0 (85%); 1,704 FSUs to Grade 1 (6%); and 2,418 FSUs to Grade 2 (9%). The total number of labeled FSUs was 26,728. The labeled FSUs were randomly divided into train-validation-test sets in an approximately 7:1:2 ratio. The total number of unlabeled FSUs was 26,614.

Using 66 studies with duplicated radiology readings of 300 FSUs, agreement rates were additionally calculated between radiologists: inter-reader agreement was determined to be 87% for none/mild cases, 57% for moderate cases, and 83% for severe cases.

Presented below in Table 1 is a summary of experimental results demonstrating the improvements provided by the presently disclosed systems, methods and techniques for removing or reducing labeling noise from medical imaging training data samples:

TABLE 1

Comparison between baseline TracIn self-influence technique (Baseline), self-influence-based filtering with various hard thresholds (Filter Top 4%, 8%, 25%), and the presently disclosed ranked reweighing approach of Eq. (2) (with p = 15% and 25%).

| Method | Micro Acc | Macro Acc |
|---|---|---|
| Baseline | 78:0 ± 1:8 | 75:6 ± 1:2 |
| Filter Top 4% | 79:4 ± 0:9 | 76:6 ± 1:3 |
| Filter Top 8% | 79:4 ± 1:2 | 76:3 ± 0:3 |
| Filter Top 25% | 75:8 ± 2:4 | 76:0 ± 0:5 |
| Re-weighing p = 15% | 79:4 ± 0:8 | 76:4 ± 1:0 |
| Re-weighing p = 25% | 81:0 ± 1:4 | 77:2 ± 0:8 |

As seen in Table 1, the micro and macro test accuracy demonstrated significant improvements relative to both the baseline approach and the hard threshold filtering approach. The experimental results of Table 1 were obtained using 900 class-balanced training data samples and 450 validation samples over 4 runs. Results are indicated as percentages. The baseline evaluation consisted of three independent ResNet50-like encoders, one per each sequence, whose embeddings were concatenated and fed into a final regression layer to grade the stenosis.

Based on the previously described noise levels that were determined based on the inter-reader agreement rates calculated between radiologists (e.g., 13% noise level in none/mild class; 43% noise level in moderate class; 17% noise level in severe class), and the fact that non every high-self influence sample is necessarily mislabeled, Table 1 depicts the results of re-weighing the training samples with the highest p=15% and p=25% self-influence values.

With respect to the results depicted in Table 1, the better performance was achieved with more re-weighting (e.g., p=25%). In comparison to p=15%, with p=25% more samples were considered as uncertain or potentially noisy. Moreover, p=25% may be better aligned with the observed inter-rater variability within the dataset, which was about 25% in average (e.g., as given above in the noise levels). Additionally, by choosing a lower percentile threshold for re-weighing (e.g., $75^{th}$ percentile for p=25%, as opposed to $85^{th}$ percentile for p=15%), the training samples with the highest calculated self-influence values are assigned an even lower weight in comparison to when a higher percentile threshold is chosen.

Figure 5:
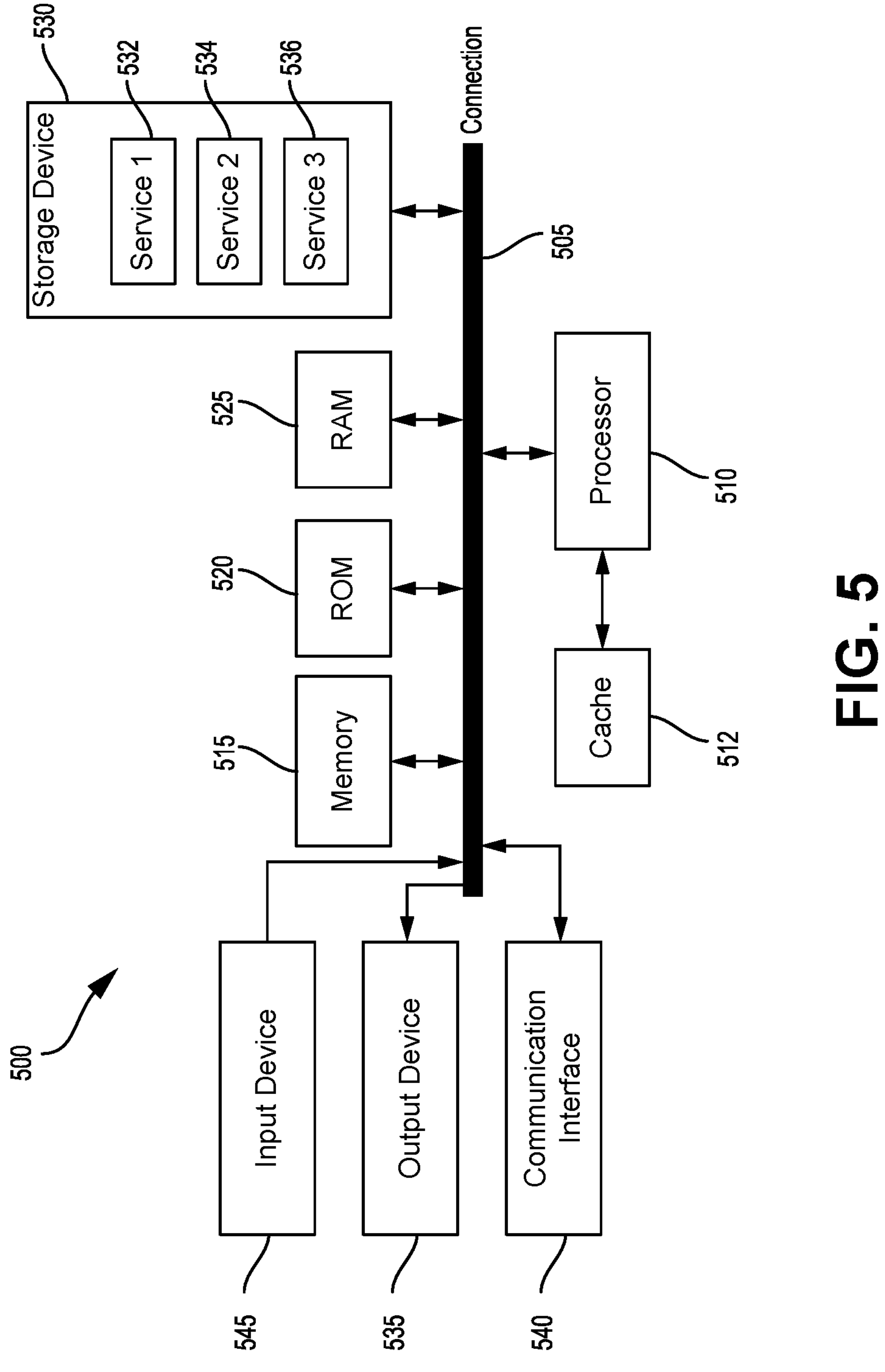
FIG. 5 illustrates an example computing system that can be used to implement various aspects described herein.

FIG. 5 illustrates an example computing device architecture 500 of an example computing device which can implement the various techniques described herein. In some examples, the computing device can include a mobile device, a wearable device, an XR device, a personal computer, a laptop computer, a video server, a video game console, a robotic device, a set-top box, a television, a camera, a server, or other device. For example, the computing device architecture 500 can implement the neural P-frame coding system 800 of FIG. 8. The components of computing device architecture 500 are shown in electrical communication with each other using connection 505, such as a bus. The example computing device architecture 500 includes a processing unit (CPU or processor) 510 and computing device connection 505 that couples various computing device components including computing device memory 515, such as read only memory (ROM) 520 and random access memory (RAM) 525, to processor 510.

Computing device architecture 500 can include a cache of high-speed memory connected directly with, in close proximity to, or integrated as part of processor 510. Computing device architecture 500 can copy data from memory 515 and/or the storage device 530 to cache 512 for quick access by processor 510. In this way, the cache can provide a performance boost that avoids processor 510 delays while waiting for data. These and other modules can control or be configured to control processor 510 to perform various actions. Other computing device memory 515 may be available for use as well. Memory 515 can include multiple different types of memory with different performance characteristics. Processor 510 can include any general purpose processor and a hardware or software service, such as service 1 532, service 2 534, and service 3 536 stored in storage device 530, configured to control processor 510 as well as a special-purpose processor where software instructions are incorporated into the processor design. Processor 510 may be a self-contained system, containing multiple cores or processors, a bus, memory controller, cache, etc. A multi-core processor may be symmetric or asymmetric.

To enable user interaction with the computing device architecture 500, input device 545 can represent any number of input mechanisms, such as a microphone for speech, a touch-sensitive screen for gesture or graphical input, keyboard, mouse, motion input, speech and so forth. Output device 535 can also be one or more of a number of output mechanisms known to those of skill in the art, such as a display, projector, television, speaker device, etc. In some instances, multimodal computing devices can enable a user to provide multiple types of input to communicate with computing device architecture 500. Communication interface 540 can generally govern and manage the user input and computing device output. There is no restriction on operating on any particular hardware arrangement and therefore the basic features here may easily be substituted for improved hardware or firmware arrangements as they are developed.

Storage device 530 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 525, read only memory (ROM) 520, and hybrids thereof. Storage device 530 can include services 532, 534, 536 for controlling processor 510. Other hardware or software modules are contemplated. Storage device 530 can be connected to the computing device connection 505. In one aspect, a hardware module that performs a particular function can include the software component stored in a computer-readable medium in connection with the necessary hardware components, such as processor 510, connection 505, output device 535, and so forth, to carry out the function.

The term "device" is not limited to one or a specific number of physical objects (such as one smartphone, one controller, one processing system, and so on). As used herein, a device can include any electronic device with one or more parts that may implement at least some portions of this disclosure. While the description and examples use the term "device" to describe various aspects of this disclosure, the term "device" is not limited to a specific configuration, type, or number of objects. Additionally, the term "system" is not limited to multiple components or specific examples. For example, a system may be implemented on one or more printed circuit boards or other substrates, and may have movable or static components. While the description and examples use the term "system" to describe various aspects of this disclosure, the term "system" is not limited to a specific configuration, type, or number of objects.

Specific details are provided in the description to provide a thorough understanding of the aspects and examples provided herein. However, it will be understood by one of ordinary skill in the art that the aspects may be practiced without these specific details. For clarity of explanation, in some instances the present technology may be presented as including individual functional blocks including functional blocks comprising devices, device components, steps or routines in a method embodied in software, or combinations of hardware and software. Additional components may be used other than those shown in the figures and/or described herein. For example, circuits, systems, networks, processes, and other components may be shown as components in block diagram form in order not to obscure the aspects in unnecessary detail. In other instances, well-known circuits, processes, algorithms, structures, and techniques may be shown without unnecessary detail in order to avoid obscuring the examples.

Individual aspects and/or examples may be described above as a process or method which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Processes and methods according to the above-described examples can be implemented using computer-executable instructions that are stored or otherwise available from computer-readable media. Such instructions can include, for example, instructions and data which cause or otherwise configure a general-purpose computer, special purpose computer, or a processing device to perform a certain function or group of functions. Portions of computer resources used can be accessible over a network. The computer executable instructions may be, for example, binaries, intermediate format instructions such as assembly language, firmware, source code, etc.

The term “computer-readable medium” includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as flash memory, memory or memory devices, magnetic or optical disks, flash memory, USB devices provided with non-volatile memory, networked storage devices, compact disk (CD) or digital versatile disk (DVD), any suitable combination thereof, among others. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

In some aspects, the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Devices implementing processes and methods according to these disclosures can include hardware, software, firmware, middleware, microcode, hardware description languages, or any combination thereof, and can take any of a variety of form factors. When implemented in software, firmware, middleware, or microcode, the program code or code segments to perform the necessary tasks (e.g., a computer-program product) may be stored in a computer-readable or machine-readable medium. A processor(s) may perform the necessary tasks. Typical examples of form factors include laptops, smart phones, mobile phones, tablet devices or other small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are example means for providing the functions described in the disclosure.

In the foregoing description, aspects of the application are described with reference to specific examples thereof, but those skilled in the art will recognize that the application is not limited thereto. Thus, while illustrative examples of the application have been described in detail herein, it is to be understood that the inventive concepts may be otherwise variously embodied and employed, and that the appended claims are intended to be construed to include such variations, except as limited by the prior art. Various features and aspects of the above-described application may be used individually or jointly. Further, aspects of the present disclosure can be utilized in any number of environments and applications beyond those described herein without departing from the scope of the specification. The specification and drawings are, accordingly, to be regarded as illustrative rather than restrictive. For the purposes of illustration, methods were described in a particular order. It should be appreciated that in alternate examples, the methods may be performed in a different order than that described.

One of ordinary skill will appreciate that the less than (“<”) and greater than (“>”) symbols or terminology used herein can be replaced with less than or equal to (“≤”) and greater than or equal to (“≥”) symbols, respectively, without departing from the scope of this description.

Where components are described as being “configured to” perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The phrase “coupled to” refers to any component that is physically connected to another component either directly or indirectly, and/or any component that is in communication with another component (e.g., connected to the other component over a wired or wireless connection, and/or other suitable communication interface) either directly or indirectly.

Claim language or other language reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

The various illustrative logical blocks, modules, circuits, and algorithm steps described in connection with the examples disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present application.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random-access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein.

What is claimed is:

1. An apparatus for processing image data, the apparatus comprising:

at least one memory; and at least one processor coupled to the at least one memory, the at least one processor configured to:

obtain a plurality of labeled input images comprising medical imaging data labeled with pathology detection grades selected from a set of pathology severity classifications associated with a detected pathology;

determine self-influence threshold information corresponding to the plurality of labeled input images and a pathology detection machine learning network trained on the plurality of labeled input images, wherein the self-influence threshold information includes a corresponding self-influence threshold level for each classification of the set of pathology severity classifications;

determine a respective self-influence for each respective labeled input image included in the plurality of input images, wherein the respective self-influence is determined using the respective labeled input image as a training sample and as a test sample to track loss reduction information between corresponding loss gradients across a plurality of training checkpoints configured for a baseline training procedure of the pathology detection machine learning network;

generate a respective self-influence weight for each respective labeled input image, based on a piecewise weighting according to the respective self-influence determined from the loss reduction information and the corresponding self-influence threshold level for the pathology severity classification associated with each respective labeled input image; and re-train the pathology detection machine learning network to update model parameters and generate a re-trained pathology detection machine learning network from the updated model parameters, the retraining based on a self-influence loss function and a ranked re-weighted training data set comprising each respective labeled input image weighted by its respective self-influence weight.

2. The apparatus of claim 1, wherein, to generate the respective self-influence weight for each respective labeled input image, the at least one processor is configured to:

generate the respective self-influence weight using a value of one based on a determination that the respective self-influence is less than the corresponding self-influence threshold level for the pathology severity classification associated with the respective labeled input image; and generate the respective self-influence weight using a first ratio of a self-influence associated with the corresponding self-influence threshold level and the respective self-influence, based on a determination that the respective self-influence is greater than the corresponding self-influence threshold level.

3. The apparatus of claim 2, wherein the at least one processor is further configured to:

generate the respective self-influence weight using a second ratio of the self-influence associated with the corresponding self-influence threshold level and the respective self-influence, based on a determination that the first ratio is greater than the second ratio.

4. The apparatus of claim 3, wherein the respective self-influence weight generated using the first ratio is a first reduced weighting self-influence weight and the respective self-influence weight generated using the second ratio is a second reduced weighting self-influence weight, the second reduced weighting self-influence weight less than the first reduced weighting self-influence weight.

5. The apparatus of claim 1, wherein the corresponding self-influence threshold level for a pathology severity classification is determined based on a noise level associated with a portion of the plurality of labeled input images having the pathology severity classification, and wherein the corresponding self-influence threshold level is indicative of a percentage of the portion of the plurality of labeled input images having the pathology severity classification that do not include labeling noise.

6. The apparatus of claim 1, wherein:

the plurality of labeled input images comprises a plurality of labeled medical images; and each respective labeled medical image is associated with a respective labeled class of a plurality of labeled classes included in the plurality of labeled medical images.

7. The apparatus of claim 6, wherein the at least one processor is configured to:

determine a respective set of self-influence values and a respective set of corresponding self-influence weights for labeled input images associated with each respective labeled class of the plurality of labeled classes.

8. The apparatus of claim 6, wherein each respective labeled class of the plurality of labeled medical images is associated with a different corresponding self-influence threshold level and a different range of respective self-influence values.

9. A method for processing image data, the method comprising:

obtaining a plurality of labeled input images comprising medical imaging data labeled with pathology detection grades selected from a set of pathology severity classifications associated with a detected pathology;

determining self-influence threshold information corresponding to the plurality of labeled input images and a pathology detection machine learning network trained on the plurality of labeled input images, wherein the self-influence threshold information includes a corresponding self-influence threshold level for each classification of the set of pathology severity classifications;

determining a respective self-influence for each respective labeled input image included in the plurality of input images, wherein the respective self-influence is determined using the respective labeled input image as a training sample and as a test sample to track loss reduction information between corresponding loss gradients across a plurality of training checkpoints configured for a baseline training procedure of the pathology detection machine learning network;

generating a respective self-influence weight for each respective labeled input image, based on a piecewise weighting according to the respective self-influence determined from the loss reduction information and the corresponding self-influence threshold level for the pathology severity classification associated with each respective labeled input image; and re-training the pathology detection machine learning network to update model parameters and generate a retrained pathology detection machine learning network from the updated model parameters, the retraining based on a self-influence loss function and a ranked re-weighted training data set comprising each respective labeled input image weighted by its respective self-influence weight.

10. The method of claim 9, wherein generating the respective self-influence weight for each respective labeled input image comprises:

generating the respective self-influence weight using a value of one based on a determination that the respective self-influence is less than the corresponding self-influence threshold level for the pathology severity classification associated with the respective labeled input image; and generating the respective self-influence weight using a first ratio of a self-influence associated with the corresponding self-influence threshold level and the respective self-influence, based on a determination that the respective self-influence is greater than the corresponding self-influence threshold level.

11. The method of claim 10, further comprising:

generating the respective self-influence weight using a second ratio of the self-influence associated with the corresponding self-influence threshold level and the respective self-influence, based on a determination that the first ratio is greater than the second ratio.

12. The method of claim 11, wherein the respective self-influence weight generated using the first ratio is a first reduced weighting self-influence weight and the respective self-influence weight generated using the second ratio is a second reduced weighting self-influence weight, the second reduced weighting self-influence weight less than the first reduced weighting self-influence weight.

13. The method of claim 9, wherein the corresponding self-influence threshold level for a pathology severity classification is determined based on a noise level associated with a portion of the plurality of labeled input images having the pathology severity classification, and wherein the corresponding self-influence threshold level is indicative of a percentage of the portion of the plurality of labeled input images having the pathology severity classification that do not include labeling noise.

14. The method of claim 9, wherein:

the plurality of labeled input images comprises a plurality of labeled medical images; and each respective labeled medical image is associated with a respective labeled class of a plurality of labeled classes included in the plurality of labeled medical images.

15. The method of claim 14, further comprising:

determining a respective set of self-influence values and a respective set of corresponding self-influence weights for labeled input images associated with each respective labeled class of the plurality of labeled classes.

16. The method of claim 14, wherein each respective labeled class of the plurality of labeled medical images is associated with a different threshold percentage and a different range of respective self-influence values.

17. A non-transitory computer-readable storage medium having stored therein instructions which, when executed by a processor, cause the processor to perform operations comprising:

obtaining a plurality of labeled input images comprising medical imaging data labeled with pathology detection grades selected from a set of pathology severity classifications associated with a detected pathology;

determining self-influence threshold information corresponding to the plurality of labeled input images and a pathology detection machine learning network trained on the plurality of labeled input images, wherein the self-influence threshold information includes a corresponding self-influence threshold level for each classification of the set of pathology severity classifications;

determining a respective self-influence for each respective labeled input image included in the plurality of input images, wherein the respective self-influence is determined using the respective labeled input image as a training sample and as a test sample to track loss reduction information between corresponding loss gradients across a plurality of training checkpoints configured for a baseline training procedure of the pathology detection machine learning network;

generating a respective self-influence weight for each respective labeled input image, based on a piecewise weighting according to the respective self-influence determined from the loss reduction information and the corresponding self-influence threshold level for the pathology severity classification associated with each respective labeled input image; and re-training the pathology detection machine learning network to update model parameters and generate a re-trained pathology detection machine learning network from the updated model parameters, the retraining based on a self-influence loss function and a ranked re-weighted training data set comprising each respective labeled input image weighted by its respective self-influence weight.

18. The non-transitory computer-readable storage medium of claim 17, wherein generating the respective self-influence weight for each respective labeled input image comprises:

generating the respective self-influence weight using a value of one based on a determination that the respective self-influence is less than the corresponding self-influence threshold level for the pathology severity classification associated with the respective labeled input image; and generating the respective self-influence weight using a first ratio of a self-influence associated with the corresponding self-influence threshold level and the respective self-influence, based on a determination that the respective self-influence is greater than the corresponding self-influence threshold level.

19. The non-transitory computer-readable storage medium of claim 17, wherein the corresponding self-influence threshold level for a pathology severity classification is determined based on a noise level associated with a portion of the plurality of labeled input images having the pathology severity classification, and wherein the corresponding self-influence threshold level is indicative of a percentage of the portion of the plurality of labeled input images having the pathology severity classification that do not include labeling noise.

20. The non-transitory computer-readable storage medium of claim 17, wherein:

the plurality of labeled input images comprises a plurality of labeled medical images;

each respective labeled medical image is associated with a respective labeled class of a plurality of labeled classes included in the plurality of labeled medical images; and the processor is further configured to perform operations comprising determining a respective set of self-influence values and a respective set of corresponding self-influence weights for labeled input images associated with each respective labeled class of the plurality of labeled classes.

* * * * *